US008812403B2

(12) United States Patent
Mercuri

(10) Patent No.: US 8,812,403 B2
(45) Date of Patent: Aug. 19, 2014

(54) LONG TERM WORKFLOW MANAGEMENT

(75) Inventor: Marc Mercuri, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 12/941,086

(22) Filed: Nov. 8, 2010

(65) Prior Publication Data

US 2012/0116980 A1    May 10, 2012

(51) Int. Cl.
*G06Q 10/06* (2012.01)

(52) U.S. Cl.
USPC .......................................................... 705/301

(58) Field of Classification Search
USPC .................................. 705/7.22, 301; 707/608
See application file for complete search history.

(56) References Cited

U.S. PATENT DOCUMENTS

| 5,826,239 | A | * | 10/1998 | Du et al. ........................ 705/7.26 |
| 6,275,867 | B1 | | 8/2001 | Bendert et al. |
| 6,996,556 | B2 | | 2/2006 | Boger et al. |
| 7,523,286 | B2 | | 4/2009 | Ramany et al. |
| 2005/0144166 | A1 | * | 6/2005 | Chapus et al. ..................... 707/6 |
| 2008/0201191 | A1 | * | 8/2008 | Carter ............................... 705/8 |
| 2010/0057529 | A1 | * | 3/2010 | Boss et al. ........................ 705/10 |
| 2010/0114780 | A1 | * | 5/2010 | Tribe et al. ........................ 705/50 |
| 2011/0161391 | A1 | * | 6/2011 | Araujo et al. .................. 709/201 |

OTHER PUBLICATIONS

Li, et al., "Dynamic Hashing: Adaptive Metadata Management for Petabyte-scale File Systems", Retrieved at <<http://storageconference.org/2006/Papers/2006-020-Li.pdf>>, pp. 6.
Cai, et al., "Performance Evaluation of a Load Self-Balancing Method for Heterogeneous Metadata Server Cluster Using Trace-Driven and Synthetic Workload Simulation", Retrieved at << http://ieeexplore.ieee.org/stamp/stamp.jsp?tp=&arnumber=4228323 >>, Parallel and Distributed Processing Symposium, IEEE International, Mar. 26-30, 2007, pp. 8.
Jaiphakdee, et al., "Dynamic Load Balancing of Short Videos in Heterogeneous Storage Environment", Retrieved at << http://www.iaeng.org/publication/IMECS2010/IMECS2010_pp436-440.pdf >>, Proceedings of the International MultiConference of Engineers and Computer Scientists, vol. I, Mar. 17-19, 2010, pp. 5.
Sinnamohideen, et al., "A Transparently-Scalable Metadata Service for the Ursa Minor Storage System", Retrieved at << http://www.pdl.cmu.edu/PDL-FTP/SelfStar/usenix10.pdf >>, Usenix Annual Technical Conference, Jun. 23-25, 2010, pp. 14.

* cited by examiner

*Primary Examiner* — Candice D Wilson
*Assistant Examiner* — Jonathan Lindsey, III
(74) *Attorney, Agent, or Firm* — Kevin Sullivan; Kate Drakos; Micky Minhas

(57) ABSTRACT

A workflow may be moved from one provider to another provider by extracting the metadata from an executing workflow describing the workflow state as part of dehydrating the workflow, and transferring the metadata to a second workflow and rehydrating the workflow at a second provider. An automated workflow manager may determine when to move the workflow and may facilitate moving with or without human intervention. When a workflow is moved from one provider to another, the workflow state may be moved without transferring executable code that executes the workflow.

20 Claims, 3 Drawing Sheets

LONG TERM WORKFLOW MANAGEMENT

BACKGROUND

Long running workflows and services may execute for many minutes, days, months, or even years. An example of a long running workflow may be an online agent that constantly searches for products or information that meet certain criteria, or an expense report system that processes a company's expense reports. Over time, the workflows may experience hardware availability, change of ownership of a service provider, or other events.

SUMMARY

A workflow may be moved from one provider to another provider by extracting the metadata from an executing workflow describing the workflow state as part of dehydrating the workflow, and transferring the metadata to a second workflow and rehydrating the workflow at a second provider. An automated workflow manager may determine when to move the workflow and may facilitate moving with or without human intervention. When a workflow is moved from one provider to another, the workflow state may be moved without transferring executable code that executes the workflow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
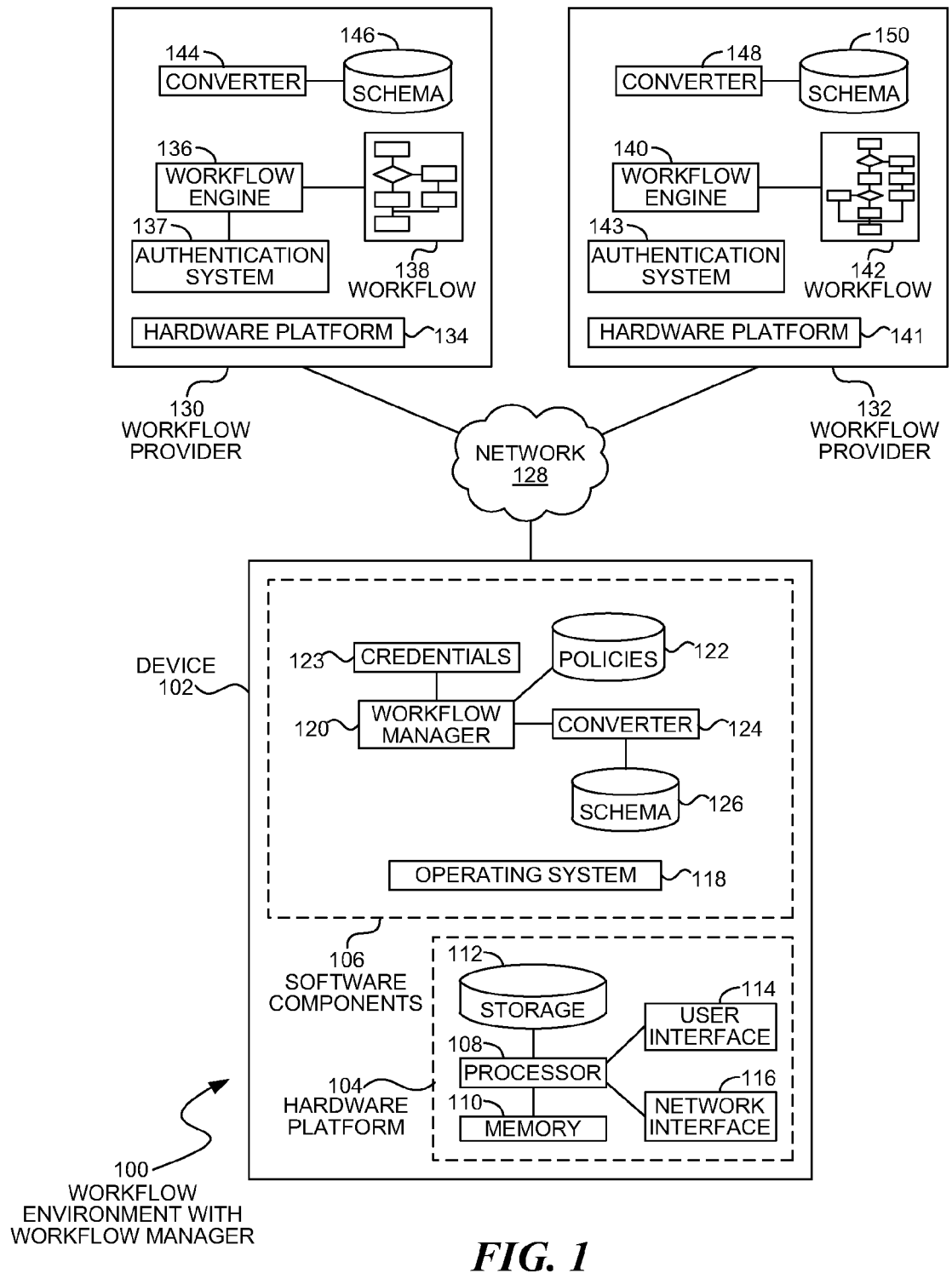
FIG. 1 is a diagram illustration of an embodiment showing a system with a workflow manager.

A workflow may be moved from one workflow provider to a second workflow provider by transferring the workflow state between the providers. The workflow state may be transferred so that the second workflow provider may resume the workflow without losing work items being processed by the workflow.

A workflow may be a sequence of work steps that may be executed by a computer system and may operate on work items. The sequence of work steps may or may not be exactly the same between the two workflow providers, and the workflow providers may or may not share the same executable code.

A workflow may include steps that operate automatically and steps that include human interaction. For example, a workflow that processes travel expense reports may include a work step that involves a human to review and approve certain expenses in certain conditions.

The workflow may be a long running workflow that may operate for months or even years. By having the ability to move the workflow from one provider to another, an administrator may have the flexibility to change providers to achieve lower costs or better service, or to change providers in the event that a current provider goes out of business or for some other reason. The workflow may be moved without losing the workflow state, so that work may not be lost or compromised when transferring to another provider.

Throughout this specification and claims, the term "workflow" is used to designate a service performed by a workflow provider that may contain one or more work steps. The service may be a workflow application, which may be a software application which automates, at least to some degree, a process or processes. The processes may be any process that can be defined in a series of steps that may be automated using software. In many embodiments, a workflow may be business-related. Some steps of the process may require human intervention, such as an approval or the addition of specific information, but functions that can be automated may generally be handled by the workflow application.

As an example of a workflow, a purchase order may move through various departments for authorization and eventual purchase. The order may be automatically moved from department to department for approval by human members of a department. In some cases, a department may perform an automated analysis to approve or disapprove the purchase order. When all authorizations are obtained, the requester of the purchase order may be notified and given authorization to make the purchase. A workflow process may involve change and update. For example, the normal approver of purchase orders may be on vacation, in which case, the application may request approval from alternate approvers.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing an environment in which a workflow manager may manage workflows between different workflow providers by moving workflows from one provider to another. Embodiment 100 is a simplified example of a network environment in which multiple workflow providers may operate.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example embodiment showing a device 102 and two workflow providers 130 and 132 that are connected through a network 128. The device 102 may have a workflow manager that may be capable of moving a workflow from one workflow provider to another. The operations of moving a workflow from one provider to another may be a component in an automated system for managing workflows.

Some workflows may be long running, and may stay active and operational for days, weeks, months, or even years. During such a long time, the workflow service provider may go out of business, be acquired, raise their rates, change their service level agreements, change the geography in which a workflow is run and/or stored, suffer performance problems, or have other issues that may cause a workflow owner or user to desire to have the workflow transferred to another provider.

In some instances, a workflow may be moved from one provider to another with changes to the rate structures, which may vary with the time of day or current workflow. In such instances, an automated workflow manager may monitor the current costs of a workflow provider and compare the costs to another workflow provider, and may move the workflow between providers to achieve a best cost. In some such embodiments, an automated workflow manager may transfer a workflow between several workflow providers multiple times per day.

A workflow manager may transfer a workflow between providers by transferring the workflow state from one provider to another. The workflow state may define the items in process as well as any items in queue for processing, along with the results of any processed items. The workflow state may also include customizations or specialized settings that may be applied to the workflow to adapt the workflow for a particular user.

In some cases, the representation of a workflow on one workflow provider may not be exactly the same as the workflow available on a second provider. In such cases, the state from one workflow may be transformed, translated, converted, or otherwise processed so that the state may match the state on a destination workflow provider. In some such embodiments, a schema may be defined for each workflow and a translator or converter may convert the state from one workflow provider to be compatible with another workflow provider.

In general, a workflow may be transferred from one workflow provider without having to transfer all of the executable code associated with the workflow. In some cases, a portion of the executable code associated with a workflow may be transferred to another workflow provider.

When a workflow is transferred, the state of the workflow may be transferred, and the state may be used by the workflow provider receiving the workflow to rehydrate the workflow. Prior to transferring the workflow, the workflow may be dehydrated by causing the processes being performed to be halted and the state of those processes captured.

A workflow may be executed by a workflow engine that may be a software application that may manage and execute modeled computer processes. The workflow engine may interpret events, such as documents submitted to a server or due dates expiring, and may act on the events according to defined computer processes. The events may be considered work items processed by the workflow. The actions may be, for example, saving a document in a document management system or issuing new work by sending an e-mail to users or escalating overdue work items to management. A workflow engine may facilitate the flow of information, tasks, and events. In some embodiments, workflow engines may also be referred to as a Workflow Orchestration Engines.

Many workflows may be designed to process various work items. In a document-centric workflow, a document may be a work item that may be processed. In an event-centric workflow, an event or group of events may be a work item. Other embodiments may have different types of work items.

Each workflow may be defined by a series of work steps. In many workflow languages, the steps may be distinct decision points or operations that may be performed. In some instances, the operations may be performed on the work item itself, or may spawn other actions that may not affect the work item.

Workflows may be defined with various decision points and branches. The decision points or branches may allow various options or conditions to be assessed and the workflow may change paths based on the decision points. In many embodiments, a decision point may be defined in the form of an IF-THEN-ELSE statement or other decision mechanisms may be used.

In some embodiments, workflows may be defined using specialized workflow definition languages, such as XPDL, BPEL, BPMN, ASAP, Wf-XML, Windows Workflow Foundation, and others. In some embodiments, the workflows may be defined in a language that may be interpreted, while other embodiments, the workflows may be defined in a compiled language. Some embodiments may have graphical mechanisms for defining workflows using graphical flowcharts or other mechanisms.

In still other embodiments, the workflows may be defined in a manner that may not be exposed to a user. In such embodiments, the workflow may receive requests and respond with results. The requests may contain a work item to process and the workflow may return some type of results. Such embodiments may operate as an Application Programming Interface (API).

In some embodiments, a workflow may be transferred in stages. A staged transfer of a workflow may be useful in embodiments where work items may be in a state that may be non-transferrable. In such embodiments, the first workflow may be allowed to continue to process work items that are still in-process until either the work items are completed or brought to a state where the work items may be transferred.

In some staged transfers, a workflow may be moved by first redirecting any new requests to the new workflow provider, then notifying the existing workflow provider to begin a shutdown operation. The shutdown operation may allow existing work items to execute to completion, or may process work items to a point where the work items may be transferred to the new workflow provider. In some such embodiments, work items may be transferred to a new workflow provider when the work items have not been processed to completion.

Several examples of workflows may aid in understanding the transfer process.

In one example, a search workflow may be defined that searches the Internet, weblogs, scientific journals, financial and business literature, or some other group of publications for specific set of keywords or relating to specific subjects. The search workflow may be configured to identify a matching publication and transmit a summary of the publication to a user's email. Over time, the search workflow may refine the search terms by receiving feedback from the user for the search results. In such an example, the search workflow may identify a publication and transmit the publication to the user, then receive feedback from the user as to the relevance of the publication. The work item may be the search result and feedback response, and the state of the workflow may be the current search terms, the most recent results, the frequency at which to perform the search, and other items.

When such a workflow is transferred to another workflow provider, the workflow providers may each be a specialized search engine with separate and proprietary search algorithms. The workload may be transferred by retrieving the workload state from the first workflow provider, which may include the current search terms, weighting for the search terms, scope of search, frequency of search, email addresses for the recipients, and other parameters. Those parameters may be transferred to the new workload provider, which may be another search engine. The new search engine may receive the parameters and begin performing the search.

The search engine workflow may be a simple workflow but an example of a workflow that may be operational for many weeks, months, or even years. For search engines that search specialized databases, a user may pay a subscription fee. An automated workflow manager may analyze the subscription fees between two workflow providers and may determine that the workflow may be transferred from one provider to another when a periodic subscription may be due for renewal, for example.

In some embodiments, the parameters from one workflow may be translated, converted, or otherwise modified to match parameters used by the receiving workflow. In some cases, the parameters may be readily translated or reformatted to match a schema defined for the receiving workflow. In other cases, an executable process may perform complex translations from one schema to another.

In another example, a workflow provider may provide a workflow for managing expense reports for a business. In such an example, employees of a company may submit expenses for business trips to the workflow and those expenses may be analyzed by the workflow and sent to various people within the business for approval. In the workflow, certain types of expenses may be approved by different managers and certain employees may be granted higher or lower limits on the types of approved expenses. Within the workflow, the expenses may be analyzed to determine which managers are authorized to approve the expenses and the workflow may route the expenses to the appropriate manager for approval. The workflow may detect that a manager may be unavailable and may route the expenses to an alternate manager. When the expenses are approved, the workflow may pay the expenses by transferring money from various accounts and paying the employee.

In such an example, the work items for the workflow may be individual expense reports. The workflow may manage communication between the various approval managers and maintain a database of in-process expense reports, as well as financial accounts for different types of expenses and various rules that may be periodically updated that define which managers are authorized to approve which expenses.

An automated workflow manager may transfer such a workflow to another provider when there may be a cost advantage to change providers, or when a new provider may have an improved workflow that has additional features not available in a current workflow, among other conditions.

In transferring such a workflow, an automated workflow manager may configure the new workflow provider by requesting a workflow state from the existing workflow provider. The workflow state may be transferred in two parts. In the first part, the workflow state may include parameters defining how the first workflow behaves and input from actors engaged in the workflow—both human and software or machine driven. In the example, the first part may include email addresses of the various managers, their approval limits and conditions, and whether they have opted to approve or reject the expenses on the report. The first set of workflow state may be transferred to the new workflow provider and used to configure the new workflow provider to accept new work items.

Once the new workflow provider has been configured, the new workflow provider may begin receiving new work items. At such a point, the automated workflow manager may stop sending new work items to the current workflow and may begin directing new work items to the new workflow.

The automated workflow manager may issue a stop command to the existing workflow provider to place the workflow in a state for transferring the workflow. In the example, the current workflow may have some expenses that are out for approval by certain managers but where the approval has not been received from the manager. The approvals may be, for example, an email message that the manager may approve or disapprove and return to the workflow.

In such a situation, the approvals that are out for approval may not be in a state for transfer. After receiving a command to stop processing, the current workflow may wait for any items out for approval to be returned and may further process the returns to a point where the work items may be transferrable. Meanwhile, the second workflow provider may begin processing new work items. In the example, the approval process may allow the approval managers several days to approve or disapprove certain expenses. Some expenses may be automatically approved when the expenses are below a certain dollar amount, while other expenses over a certain dollar amount may only be approved or disapproved after the approving manager takes affirmative action to approve or deny. In such cases, the expenses may be in process for an extended period of time.

If the workflow was moved while an expense was in the approval cycle, an approval manager may receive one set of expenses from the first workflow and then another request to approve or deny the same expenses from the second workflow. Such a situation may be confusing to the manager, who may approve the first set of expenses and deny the second. In order to avoid the confusion, the items in the approval process may be permitted to continue the workflow until the work items are in a state for transfer.

Once the in-process work items have been processed to a state where transfer may be performed, a second part of the workflow state may be transferred to the new workflow provider. The second part may include items that were in-process when the initial transfer may have been performed.

In the example, the expense report workflows from each provider may have different steps and may provide different features. In such an embodiment, the executable code performed by the two workflow providers may be different, and the workflow state may be the only information transferred between the workflow providers.

In some embodiments, some executable code may be transferred between the workflow providers. In such embodiments, a script or customized workflow component may be transferred between workflow providers when a workflow may be moved. For example, two different workflow providers may have generic expense report processing workflows. When establishing and configuring the workflow, a business may include a script or other executable that customizes a portion of the workflow to the specific business process. When that workflow may be moved to another workflow provider, the customized executable may also be transferred to the new workflow provider.

In many embodiments, the workflow providers may include audit logs and may have various authorization procedures for transferring workflows. Many workflows may be sensitive business processes on which a business may rely for the operation of the business, and where stopping a business workflow may have serious financial consequences to the business. In such embodiments, an automated workflow manager may have authorization credentials that may be used to authenticate requests to change the workflows, including starting, stopping, and reconfiguring the workflow. The authorization credentials may be used to establish relationships with new workflow providers and to authorized moving workflows between providers.

The workflow providers may maintain and provide audit logs that record changes to the workflows. When a workflow provider may receive authorization to stop operation, for example, the audit log may record the authorization. For business sensitive workflows, such an audit log may be used in the event of a lawsuit to verify that there was proper authorization to halt the business sensitive workflow, for example.

The device 102 is illustrated as having an automated workflow manager. The device 102 is illustrated having hardware components 104 and software components 106. The device 102 as illustrated represents a conventional computing device, although other embodiments may have different configurations, architectures, or components.

The device 102 may be a server computer, desktop computer, or comparable device. In some embodiments, the device 102 may be a laptop computer, netbook computer, tablet or slate computer, wireless handset, cellular telephone, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware platform 104, and may include various routines and functions that communicate directly with various hardware components.

A workflow manager 120 may be an application executing within the operating system 118. The workflow manager 120 may coordinate the transfer of workflows from one workflow provider to another, as well as perform other management tasks. In some embodiments, the workflow manager 120 may have a user interface through which an administrator may configure an existing workflow, observe performance statistics of a workflow, and perform other management tasks.

In some embodiments, the workflow manager 120 may perform workflow transfers based on a human authorization. In such embodiments, an administrator may manually cause a workflow to be transferred, and the administrator may perform some of the tasks related to transferring the workflow, including establishing an account or authorization with a new workflow provider.

In many embodiments, the workflow manager 120 may be capable of automatically determining when to change workflow providers and to automatically cause a workflow to be transferred.

The workflow manager 120 may have a set of policies 122 which may be used to determine when to change workflow providers. The policies 122 may define conditions for when to evaluate different workflow providers and for when to move a workflow from one workflow provider to another.

The workflow manager 120 may be capable of evaluating different workflow providers. For example, the workflow manager 120 may be capable of contacting one, two, or many different workflow providers to request various criteria that may be used to determine whether or not a workflow may be moved and to which workflow provider the move may occur. For example, the workflow manager 120 may be capable of requesting cost, performance, or other information from two or more workflow providers and comparing that information with a current workflow provider. Based on the criteria defined in the policies 122, the workflow manager 120 may select a new workflow provider and cause a workflow to be moved to the new provider.

In some cases, the device 102 may include a converter 124 that may convert the state from one workflow to a state compatible with a new provider. The converter 124 may use a schema 126 to define how the conversion may take place. The schema 126 may include schemas for both the current and new workflows and may determine a mapping between the two schemas. In some embodiments, only one schema may be provided and the converter 124 may perform a conversion. Some converters 124 may not use a schema 126 to perform a conversion.

The workflow manager 120 may have a set of credentials 123 that may be used to authenticate against different workflow providers. The credentials 123 may be used when performing changes to the workflows, including authorizing workflows to start, stop, and be transferred.

In many embodiments, accounts may be set up with different workflow providers. An administrator may establish an account, which may include authentication credentials, method of payment, and other information. After setting up the account with various workflow providers, the workflow manager 120 may evaluate whether or not to move a workflow to one of the workflow providers and may cause the workflow to be moved with or without human intervention.

In some cases, the workflow manager 120 may evaluate different workflow providers and identify a potential provider that may have additional features, operate at a lower cost, offer better performance, or otherwise meet the criteria in the policies 122 for transferring the workflow. After the potential workflow provider may be identified, an administrator may establish an account with the new workflow provider, receive credentials for operating with the new workflow provider, and the workflow manager 120 may transfer the workflow.

The workflow providers 130 and 132 may be accessible over a network 128. In many cases, the network 128 may be the Internet, and the network 128 may include various local area networks, wide area networks, or other types of networks.

The workflow provider 130 may have a hardware platform 134 on which a workflow engine 136 may execute a first workflow 138. The hardware platform 134 may be a single hardware platform, such as a server computer. In some embodiments, the hardware platform 134 may be a cloud computing hardware platform, virtual machine, or other type of computing platform.

The workflow engine 136 may execute the workflow 138 using any type of workflow definition. In some embodiments, the workflow may be defined using various languages specific to workflows. In other embodiments, the workflow may be defined using custom designed computer code that may execute a workflow. Such embodiments may or may not have a separate workflow engine 136.

The workflow engine 136 may include an authentication system 137 which may authenticate an administrator or a workflow manager 120 when receiving various commands that may change the operation of the workflow 138. In many embodiments, the workflow 138 may be a business-sensitive operation that may result in substantial financial loss if the workflow were halted or changed. In some embodiments, the authentication system 137 may be used to verify the identity of an agent who may make changes to the workflow.

In many embodiments, the workflow provider 130 may include a converter 144 and schema 146. The converter 144 and schema 146 may be used to translate incoming or outgoing workflow states into or out of formats that may be compatible with the workflow engine 136.

Similar to workflow provider 130, workflow provider 132 may have a hardware platform 141, a workflow engine 140 that may execute a workflow 142, an authentication system 143, and a converter 148 that may consume a schema 150.

Figure 2:
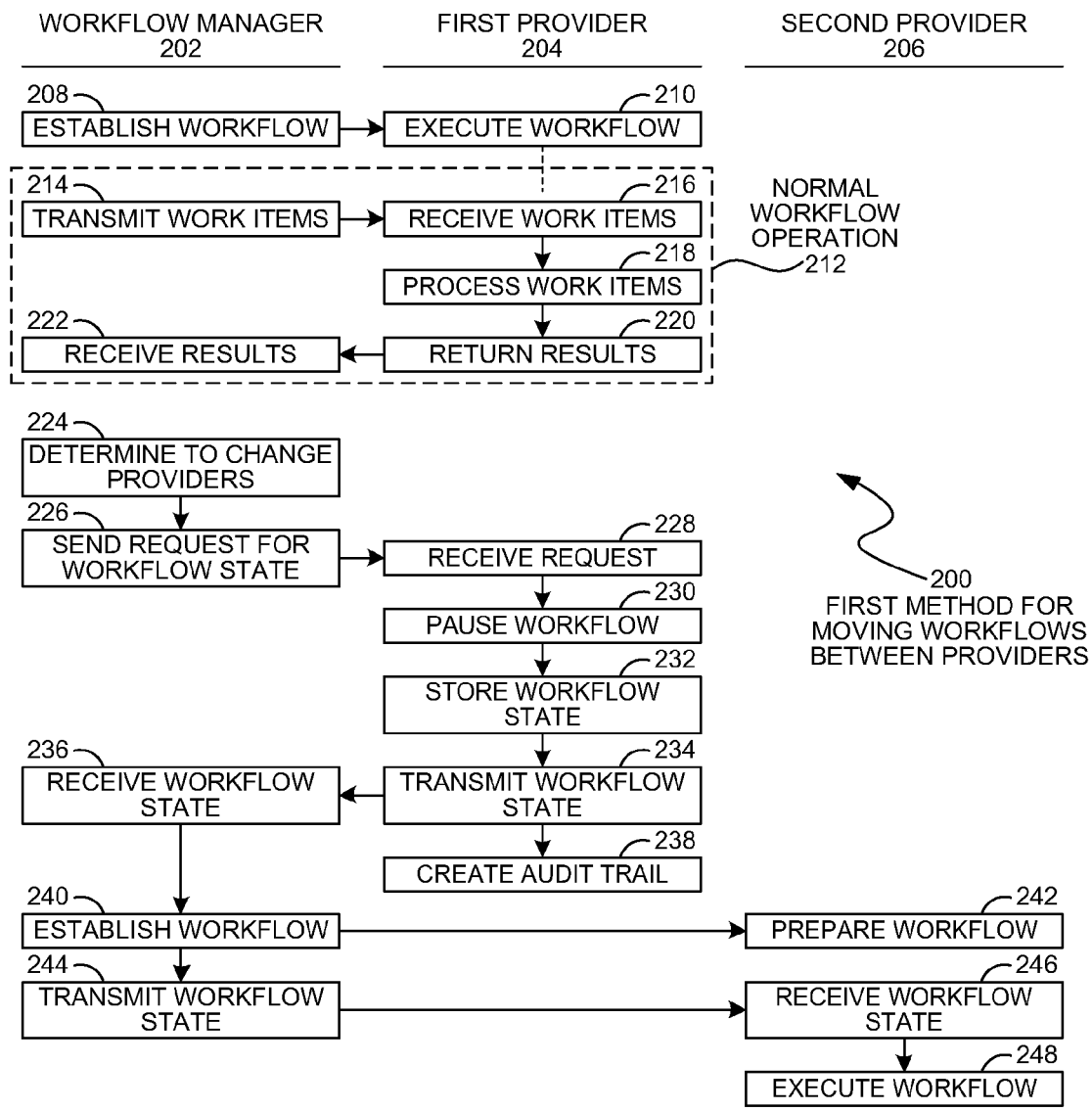
FIG. 2 is a timeline illustration of an embodiment showing a method for transferring a workflow from one workflow provider to another.

FIG. 2 is a timeline illustration of an embodiment 200 showing a method for moving workflows between providers. Embodiment 200 is a simplified example of a basic method for moving workflows. Embodiment 300, presented later in this specification, illustrates a staged method for moving workflows between providers. Embodiment 200 illustrates the operations of a workflow manager 202 in the left hand column, the operations of a first workflow provider 204 in the center column, and the operations of the second workflow provider 206 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a simplified method for moving a workflow from one provider to another. The workflow may be moved in a single step by receiving the workflow state from the first provider and transferring the workflow state to the second provider. Once the second provider receives the workflow state, the second provider may begin executing the workflow.

In block 208, a workflow manager 202 may establish a workflow which may be executed by the first workflow provider 204 in block 210. In some cases, the process of establishing, configuring, testing, and launching a workflow may be a long process.

The normal operation of the workflow may be illustrated in block 212. A workflow manager 202 or other entity may transmit work items in block 214, which may be received by the first provider 202 in block 216. The work items may be processed in block 218 and results may be returned in block 220, which may be received by the workflow manager 202 or other entity in block 222. In some embodiments, a work item may be transmitted to the workflow and processed. In other embodiments, a work item may be created by the workflow based on some condition or event.

In block 224, the workflow manager 202 may determine that the workflow may be moved to another workflow provider. In some embodiments, the workflow manager 202 may determine such a condition exists automatically, while in other embodiments, a human administrator may determine the condition. In some embodiments, the workflow manager 202 may determine that the condition exists, but no action may be taken until a human administrator approves the change.

In block 226, the workflow manager 202 may send a request to the first workflow provider 204 for the workflow state. The request may be received in block 228 by the first workflow provider 204. The workflow may be paused in block 230 and the workflow state may be stored in block 232. The workflow state may be transmitted in block 234 and received by the workflow manager 202 in block 236.

The existing workflow may be paused or stopped in block 230. In some embodiments, in-process work items may be executed until a stopping point may be reached. In other embodiments, the workflow may be capable of transferring the workflow state at any time.

The first workflow provider 204 may create an audit trail in block 238. The audit trail of block 238 may include information relating to the request to change the workflow operation. In the case of embodiment 200, the change may be to stop the workflow. The audit trail of block 238 may be used to reconstruct the authorization and sequence of commands that may have led to the workflow being shut down.

Once the workflow state is received in block 236 by the workflow manager 202, the workflow manager 202 may establish a workflow in block 240 with a second workflow provider 206, which may prepare the workflow in block 242. After the workflow is prepared, the workflow manager 202 may transmit the workflow state in block 244, which the second provider 206 may receive in block 246 and begin executing the workflow in block 248. Because the second workflow provider 206 uses the existing workflow state to begin executing the workflow, the workflow may resume operations from where the first workflow provider left off.

Embodiment 200 illustrates a method whereby the workflow state may be transmitted to the workflow manager and then to the second workflow provider. In some embodiments, the workflow manager 202 may instruct the first workflow provider 204 to transmit the workflow state directly to the second workflow provider 206 without passing the workflow state through the workflow manager 202.

Figure 3:
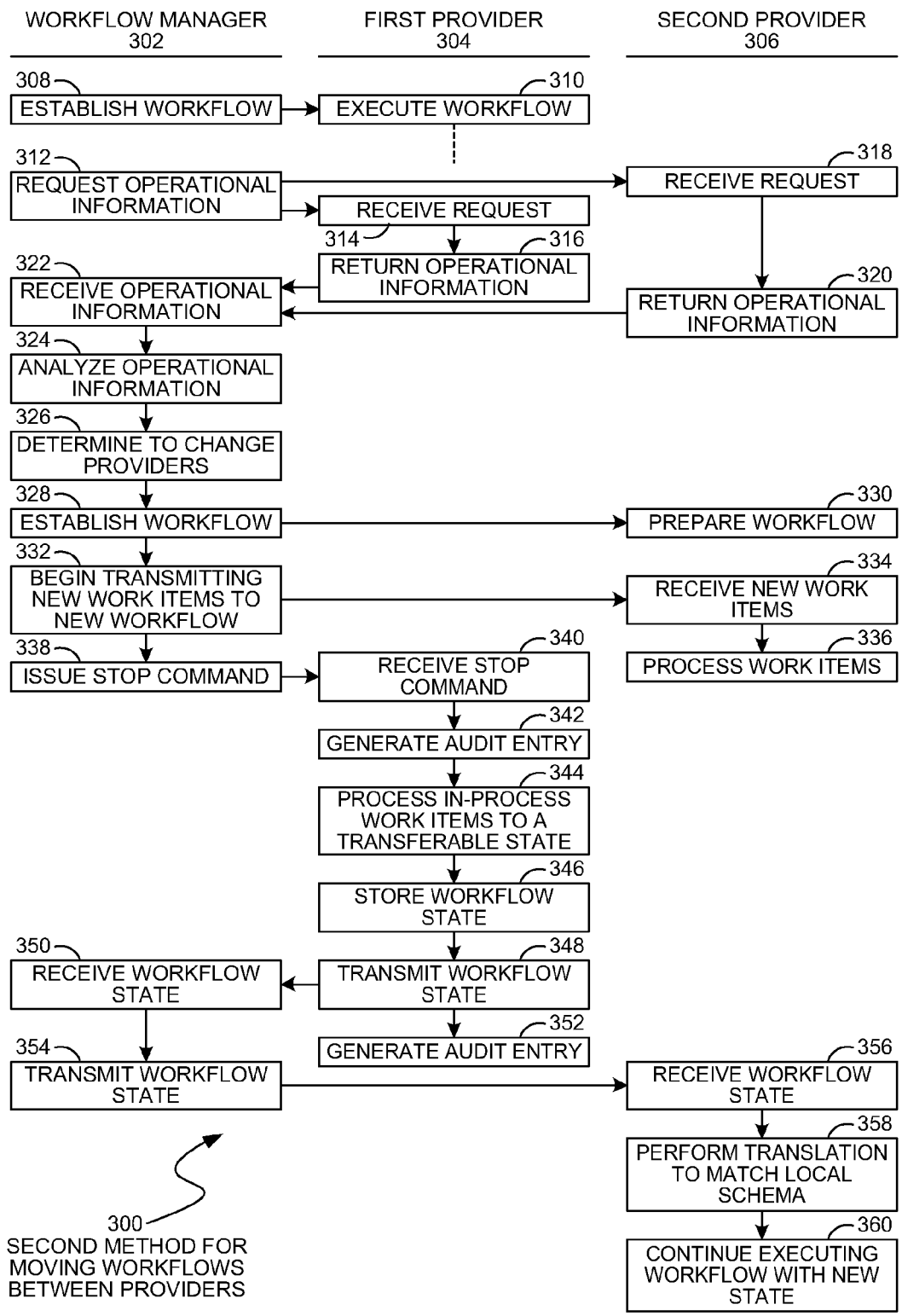
FIG. 3 is a timeline illustration of an embodiment showing a two stage method for transferring a workflow from one workflow provider to another.

FIG. 3 is a timeline illustration of an embodiment 300 showing a second method for moving workflows between providers. Embodiment 300 illustrates a staged method for moving workflows between providers. Embodiment 300 illustrates the operations of a workflow manager 302 in the left hand column, the operations of a first workflow provider 304 in the center column, and the operations of the second workflow provider 306 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a more complex method for moving a workflow between providers than embodiment 200. Embodiment 300 includes some steps that may be used prior to a workflow transfer to evaluate workflow providers, and also illustrates a two stage transfer, where some in-process work items may be processed to a transferrable state.

In block 308, the workflow manager 302 may establish a workflow with the first workflow provider 304, which may execute the workflow in block 310.

At some point after the workflow has begun execution, the workflow manager 302 may request operational information in block 312 from both the first workflow provider 304 and second workflow provider 306. The first workflow provider 304 may receive the request in block 314 and return operational information in block 316. Similarly, the second workflow provider 306 may receive the request in block 318 and return operational information in block 320. The operational information may be received by the workflow manager 302 in block 322.

The operational information may include information that may be used to determine whether or not to change workflow providers. In various embodiments, the operational information may be cost, performance metrics such as throughput or response time, feature set, or other information.

The operational information may be analyzed in block 324 and a determination may be made in block 326 to change workflow providers. Once the determination is made in block 326, a workflow may be established in block 328 between the workflow manager 302 and the second workflow provider 306, which may prepare the new workflow in block 330.

In block 332, the workflow manager 302 may begin transmitting new work items to the second workflow provider 304, which may receive the new work items in block 334 and begin processing the work items in block 336.

By begin transmitting new work items in block 332, two workflows may be operating in parallel. In some embodiments, a first set of state information may be requested from the first workflow provider 304 and transmitted to the second workflow provider 306 to configure the second workflow. The first set of state information may include state parameters used by the second workflow provider to configure the second workflow. A second set of state information may be transmitted later that may include the state associated with in-process work items.

In block 338, the workflow manager 302 may issue a stop command to the first workflow provider 304, which may be received in block 340. The first workflow provider 304 may generate an audit entry in block 342 that may log the stop command and the authorization used for the command.

In block 344, the first workflow provider 304 may process in-process work items to a transferrable state. In some embodiments, work items may be in a state that may not be transferrable, such as a transaction that may not be completed. Once the transactions are completed or when the work items are in a transferrable state, the workflow state may be stored in block 346 and may be transmitted in block 348.

The workflow state may be received in block 350 by the workflow manager 302 and may be transmitted to the second workflow provider 306 in block 354. The second workflow provider 306 may receive the workflow state in block 356 and may perform a translation or conversion in block 358 to match the local schema. The second workflow provider 306 may continue executing the workflow with the new state in block 360.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a processor;
a connection to a first workflow provider, said first workflow provider executing a representation of a workflow, said representation of said workflow comprising a first set of work steps, which when performed on work items, produces a set of results;
a connection to a second workflow provider, said second workflow provider configured to execute a second representation of said workflow, said second representation of said workflow comprising a second set of work steps, which when performed on said work items, also produces said set of results, said second set of work steps differing from said first set of work steps;
a workflow manager, the workflow manager configured to:
determine that said workflow is to be moved to said second workflow provider;
cause said workflow to be transferred from said first workflow provider to said second workflow provider, including:
cause a first part of workflow state to be transferred from said first workflow provider to said second workflow provider, said first part of workflow state for use by said second workflow provider to configure said second representation of said workflow to accept new work items;
cause new work items to be directed to said second representation of said workflow for processing after said first part of workflow state is transferred to said second workflow provider;
cause a stop command to be issued to said first workflow provider, said stop command placing said representation of said workflow in a transfer state for transferring said workflow, said transfer state permitting said representation of said workflow to continue in parallel with said second representation of said workflow to complete the handling of in-process work items to a state where transfer can be performed, said in-process work items being work items received prior to issuance of said stop command; and
cause a second part of workflow state to be transferred from said first workflow provider to said second workflow provider, said second part of workflow state including said in-process items, said second part of workflow state transferred after said issuance of said stop command; and
cause said second workflow provider to execute said second representation of said workflow.

2. The system of claim 1, wherein said first workflow provider executing a representation of a workflow comprises said first workflow provider executing first executable code; and
wherein said second workflow provider being configured to execute a second representation of said workflow comprises second workflow provider being configured to execute second executable code, said second executable code differing from said first executable code.

3. The system of claim 2, said workflow manager further configured to:
cause a portion of executable code to be transferred to said second workflow provider, said portion of executable code for implementing a customized workflow component within said second representation of said workflow, said customized workflow component having been implemented in said representation of said workflow.

4. The system of claim 1, wherein said workflow manager being configured to cause a first part of workflow state to be transferred from said first workflow provider to said second workflow provider comprises said workflow manager being configured to cause parameters to be transferred to said second workflow provider, said parameters defining how said representation of said workflow behaves.

5. The system of claim 4, said workflow manager further configured to:
transform said parameters to match said parameters to said second representation of said workflow so as to compensate for said second set of work steps differing from said first set of work steps.

6. The system of claim 1, said workflow manager that further:
presents authentication credentials to said first workflow provider prior to said causing said first part of workflow state to be transferred.

7. The system of claim 6, said workflow manager that further:
receives audit information from said first workflow provider on completion of said causing said first workflow state to be transferred.

8. The system of claim 7, said audit information comprising a reference to said authentication credentials.

9. A method performed on a computer processor, said method comprising:
identifying a first representation of a workflow executing on a first workflow provider, said first representation of said workflow being an automated succession of a first set of work steps, which when performed on work items, produces a workflow result, said work items being provided by a work requester;
identifying a second representation of a workflow available at a second workflow provider, said second representation of said workflow having a second set of work steps, which when performed on said work items, also produces said workflow result, at least one work step in said second set of work steps differing from at least one work step in said first set of work steps;
determining that said workflow is to be moved from said first workflow provider to said second workflow provider;
querying said first workflow provider to identify state information about said first representation of said workflow;
receiving a first part of workflow state from said first workflow provider;
transmitting said first portion of workflow state to said second workflow provide, said first part of workflow state for use by said second workflow provider to configure said second representation of said workflow to accept new work items;
causing new work items to be directed to said second representation of said workflow for processing after said first part of workflow state is transferred to said second workflow provider;
issuing a stop command to said first workflow provider, said stop command placing said first representation of said workflow in a transfer state for transferring said workflow, said transfer state permitting said first representation of said workflow to continue in parallel with said second representation of said workflow to complete the handling of in-process work items to a state where transfer can be performed, said in-process work items being work items received prior to issuance of said stop command;

receiving a second part of workflow state from said first workflow provider, said second part of workflow state including said in-process items, said second part of workflow state received after said issuance of said stop command;

sending said second part of workflow state to said second workflow provider; and causing said second workflow provider to execute said second representation of said workflow with said first and second parts of said workflow state; and causing said first workflow provider to halt said first representation of said workflow after receiving said second part of workflow state.

10. The method of claim 9, at least one other work step in said second set of work steps being the same as at least one other work step in said first set of work steps.

11. The method of claim 9, further comprising sending a portion of executable code to said second workflow provider, said portion of executable code for implementing a customized workflow component within said second representation of said customized workflow, said customized workflow component having also been implemented in said first representation of said workflow.

12. The method of claim 9, wherein receiving a first part of workflow state from said first workflow provider comprises receiving parameters from said first workflow provider, said parameters defining how said first representation of said workflow behaves.

13. The method of claim 12, further comprising matching said parameters to said second representation of said workflow by transforming said parameters so as to compensate for said at least one difference in work steps between said first set of work steps and said second set of work steps.

14. The method of claim 9, further comprising presenting authentication credentials to said first workflow provider prior to querying said first workflow provider.

15. The method of claim 9, further comprising receiving audit information from said first workflow provider on completion of transmitting said first portion of workflow state.

16. A computer program product for use at a computer system, the computer program product for implementing a method for transferring a workflow, the computer program product comprising one or more storage devices having stored thereon computer-executable instructions that, when executed by a processor, cause the computer system to perform the method, including the following:

determine that said workflow is to be moved from a first workflow provider to a second workflow provider;

query said first workflow provider to identify state information about said first representation of said workflow;

receive a first part of workflow state from said first workflow provider;

transmit said first portion of workflow state to said second workflow provide, said first part of workflow state for use by said second workflow provider to configure said second representation of said workflow to accept new work items;

cause new work items to be directed to said second representation of said workflow for processing after said first part of workflow state is transferred to said second workflow provider;

issue a stop command to said first workflow provider, said stop command placing said first representation of said workflow in a transfer state for transferring said workflow, said transfer state permitting said first representation of said workflow to continue in parallel with said second representation of said workflow to complete the handling of in-process work items to a state where transfer can be performed, said in-process work items being work items received prior to issuance of said stop command; and receive a second part of workflow state from said first workflow provider, said second part of workflow state including said in-process items, said second part of workflow state received after said issuance of said stop command;

send said second part of workflow state to said second workflow provider; and cause said second workflow provider to execute said second representation of said workflow with said first and second parts of said workflow state.

17. The computer program product of claim 16, further comprising computer-executable instructions that, when executed, cause the computer system to prior to determining that said workflow is to be moved:

identify a first representation of a workflow executing on said first workflow provider, said first representation of said workflow being an automated succession of a first set of work steps, which when performed on work items, produces a workflow result, said work items being provided by a work requester;

identify a second representation of said workflow available at said second workflow provider, said second representation of said workflow having a second set of work steps, which when performed on said work items, also produces said workflow result, at least one work step in said second set of work steps differing from at least one work step in said first set of work steps.

18. The computer program product of claim 17, further comprising computer-executable instructions that, when executed, cause the computer system to send a portion of executable code to said second workflow provider, said portion of executable code for implementing a customized workflow component within said second representation of said customized workflow, said customized workflow component having also been implemented in said first representation of said workflow.

19. The computer program product of claim 17, wherein computer-executable instructions that, when executed, cause the computer system to receive a first part of workflow state from said first workflow provider comprise computer-executable instructions that, when executed, cause the computer system to receive parameters from said first workflow provider, said parameters defining how said first representation of said workflow behaves.

20. The computer program product of claim 17, further comprising computer-executable instructions that, when executed, cause the computer system to match said parameters to said second representation of said workflow by transforming said parameters so as to compensate for said at least one difference in work steps between said first set of work steps and said second set of work steps.

* * * * *